(12) United States Patent
Chinta et al.

(10) Patent No.: US 9,008,108 B2
(45) Date of Patent: Apr. 14, 2015

(54) CRITERIA FOR IDENTIFYING NETWORK FRAMES

(75) Inventors: Narasimha Raju Chinta, Hyderabad (IN); Amitabha Sen, Hyderabad (IN)

(73) Assignee: Broadcom Corporation, Irvine, CA (US)

( * ) Notice: Subject to any disclaimer, the term of this patent is extended or adjusted under 35 U.S.C. 154(b) by 96 days.

(21) Appl. No.: 13/489,538

(22) Filed: Jun. 6, 2012

(65) Prior Publication Data

US 2013/0329742 A1  Dec. 12, 2013

(51) Int. Cl.
*H04L 12/28* (2006.01)
*H04L 12/741* (2013.01)
*H04L 12/721* (2013.01)
*H04L 29/06* (2006.01)
*H04J 3/24* (2006.01)
*G06F 13/00* (2006.01)

(52) U.S. Cl.
CPC .............. *H04L 45/745* (2013.01); *H04L 45/72* (2013.01)

(58) Field of Classification Search
CPC ........ H04L 12/28; H04L 45/72; H04L 45/745
USPC .................. 370/389, 392, 400–411, 338, 351
See application file for complete search history.

(56) References Cited

U.S. PATENT DOCUMENTS

| | | | | |
|---|---|---|---|---|
| 6,665,297 | B1 * | 12/2003 | Hariguchi et al. | 370/392 |
| 7,554,980 | B1 * | 6/2009 | Yeh et al. | 370/392 |
| 7,864,789 | B2 * | 1/2011 | Tate et al. | 370/410 |
| 7,933,268 | B1 * | 4/2011 | Melman et al. | 370/389 |
| 2003/0223421 | A1 * | 12/2003 | Rich et al. | 370/389 |
| 2005/0169258 | A1 * | 8/2005 | Millet et al. | 370/389 |
| 2009/0044276 | A1 * | 2/2009 | Abdel-Aziz et al. | 726/24 |
| 2009/0304386 | A1 * | 12/2009 | Effenberger | 398/58 |
| 2012/0163395 | A1 * | 6/2012 | Shukla et al. | 370/409 |
| 2013/0091349 | A1 * | 4/2013 | Chopra | 713/150 |

* cited by examiner

*Primary Examiner* — Un C Cho
*Assistant Examiner* — Peian Lou
(74) *Attorney, Agent, or Firm* — Oblon, McClelland, Maier & Neustadt, L.L.P.

(57) ABSTRACT

Disclosed are various embodiments of a network switch for storing a prefix address and a mask corresponding to the prefix address, the prefix address and the mask each representing a binary value, the mask representing a number of significant bits of an address beginning with a most significant bit. The network switch obtains a network frame via one of a plurality of network interfaces, the network frame comprising a network address in a header of the network frame, the network address being a binary value representing a physical address of a network interface device. The network switch determines a truth value associated with a comparison of a mask number of bits of the prefix and network addresses, the truth value indicating an equivalence of the comparison. In response to the truth value, the network switch may initiate at least one action associated with the network frame.

18 Claims, 3 Drawing Sheets

CRITERIA FOR IDENTIFYING NETWORK FRAMES

BACKGROUND

A variety of different network interface devices are commonly used in modern networks. The number of network interface devices used on networks is growing, as well as the diversity of the types of devices such as, for example, voice over Internet protocol (VoIP) devices, video conferencing devices, video streaming devices, wireless devices, and/or other types of devices as can be appreciated. It may be desirable for various reasons to identify data to and/or from particular network interface devices.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure relate to systems and method for identifying network frames pertaining to specific network devices based on various criteria and initiating a set of actions in response to the identification. In one embodiment among others, systems and methods according to the disclosure can be employed in a network switch or similar systems that forward network frames received from network interface devices based upon values in the network frame and/or other criteria. Embodiments of the present disclosure can also be employed in any environment in which network frames are sent and/or received. Accordingly, while discussion of the embodiments herein may be in the context of a network switch, it should be appreciated that the systems and methods of identifying network frames can be applied in other contexts as well.

Figure 1:
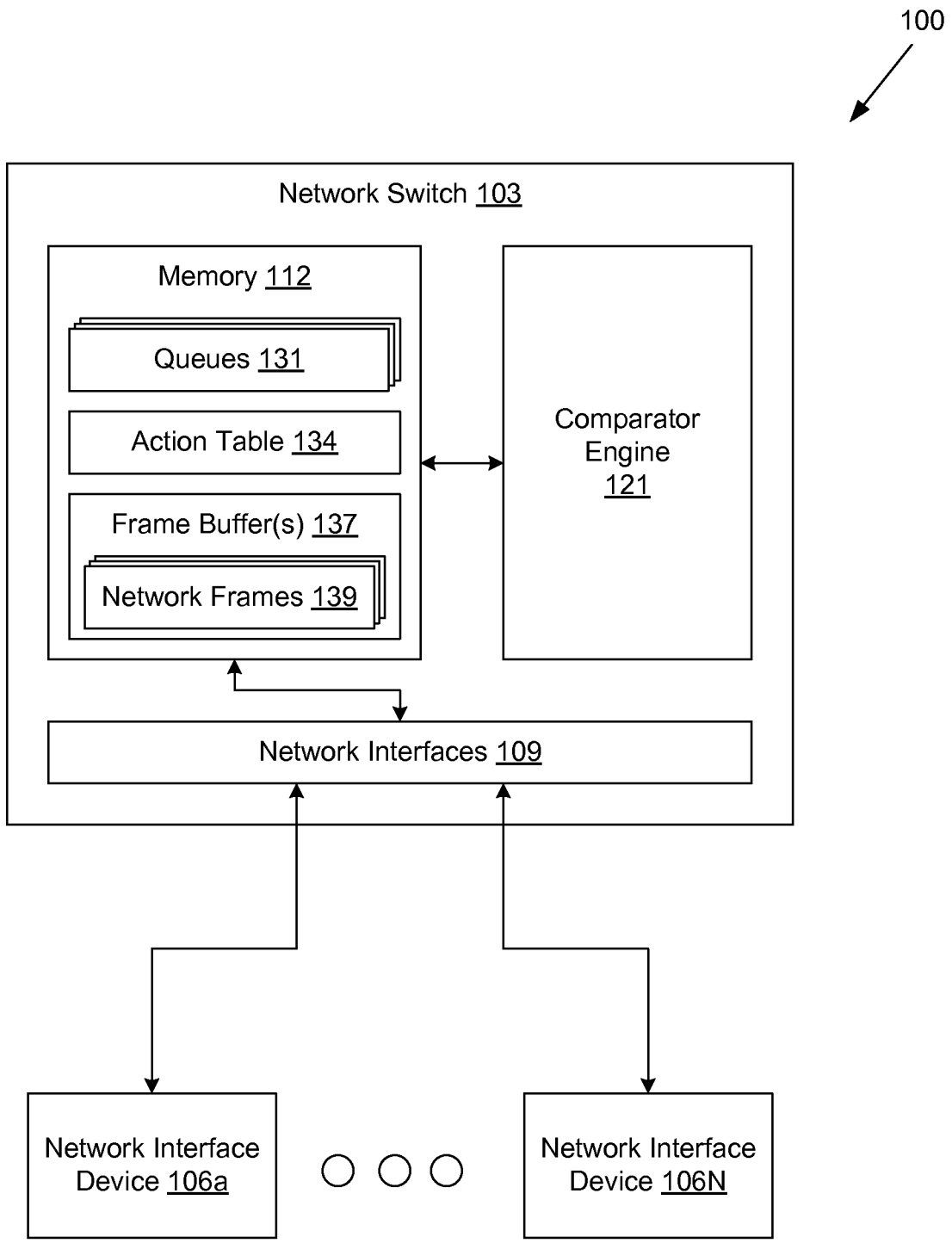
FIG. 1 is a drawing of a networked environment according to various embodiments of the present disclosure.

With reference to FIG. 1, shown is a networked environment 100 according to various embodiments. The networked environment 100 includes a network switch 103 in data communication with one or more network interface devices 106a-N. The network switch 103 may comprise, for example, a network switch 103 conforming to one or more of the Institute of Electrical and Electronics Engineers (IEEE) 802 family of standards for networks, one or more of the Global System for Mobile Communications (GSM) standards, and/or other standards as can be appreciated. The network switch 103 may further comprise a plurality of network interfaces 109 through which the network switch 103 communicates network frames and/or other types of data.

Various applications and/or other functionality may be executed in the network switch 103 according to various embodiments. Also, various data can be stored in a memory 112 that is accessible to the network switch 103. The memory 112 may be representative of a plurality of memories 112 as can be appreciated. The data stored in the memory 112, for example, is associated with the operation of the various applications and/or functional entities described below.

The components executed on the network switch 103, for example, include a comparator engine 121, and other applications, services, processes, systems, engines, or functionality not discussed in detail herein. The comparator engine 121 is executed in order to facilitate identifying network frames matching comparison criteria and initiating one or more actions for the matching network frames.

The data stored in the memory 112 includes, for example, queues 131, action table 134, a frame buffer 137, and potentially other data. The queues 131 are linear collections of network frames in which the network frames are kept for processing. The queues 131 may support the addition of network frames to the queue, removal of network frames from the queue, and/or other queue operations as can be appreciated. Each one of the queues 131 may represent a collection of network frames sharing one or more common characteristics such as, for example, the same source or destination network interface, the same priority level, and/or other possible characteristics. In some embodiments, each entity in the queue may be pointer to a network frame stored in another area of the memory 112.

The action table 134 may comprise sets of various matching criteria for identifying one or more network frames, and corresponding sets of one or more actions to initiate in response to the identified network frames. Some of the criteria may comprise, for example, one or more network addresses representing the physical addresses of network interface devices. The network addresses may be in various address lengths and/or formats as appropriate for each type of network interface 109 and network standard supported by the network switch 103. In some embodiments, a set of matching criteria may comprise one or more network addresses, as well as other associated criteria such as a virtual local area network (VLAN) identifier (VID).

The matching criteria may identify network addresses through the use of one or more prefix addresses, with each prefix address having a corresponding mask value. Each prefix address and mask combination may represent a portion of the physical address of a plurality of network interface devices. The actions may comprise, for example, placing a network frame in a queue, changing the queue of a network frame, marking the network frame 139 with a priority code point (PCP) or other priority value, changing a counter value, logging the network frame 139, discarding the network frame 139, modifying the header of the network frame 139 according to Institute of Electrical and Electronics Engineers (IEEE) 802.3ac, inserting an Institute of Electrical and Electronics Engineers (IEEE) 802.1Q header into the header of the network frame 139, and/or other possible actions as can be appreciated.

The frame buffer 137 is a portion of memory 112 used for storage of network frames 139 awaiting processing. The frame buffer 137 may be representative of a plurality of frame buffers 137 as can be appreciated. In some embodiments, all or a portion of the frame buffer 137 may reside in the network interfaces 109. Each network frame 139 may represent a digital data transmission unit of, for example, the data link layer (layer 2) of the open systems interconnection (OSI) model. Each network frame 139 may include a header comprising metadata for the network frame 139, payload data, and/or frame synchronization bits. A network frame 139 may be organized in various formats such as specified in, for example, the IEEE 802 family of standards, GSM, frame relay, asynchronous transfer mode (ATM), and/or other possible formats as can be appreciated.

The network interface device 106a-N is representative of a plurality of network interface devices 106a-N that may be coupled to the network interfaces 109 through wired or wireless technologies. The network interface device 106 may comprise, for example, another network switching or routing device, a voice over Internet protocol (VoIP) device, video conferencing devices, video streaming devices, a processor-based system such as a computer system, and/or other devices. Such a computer system may be embodied in the form of a desktop computer, laptop computer, personal digital assistant, cellular telephone, smartphone, set-top box, music players, web pads, tablet computer systems, game consoles, or other devices with like capability.

Next, a general description of the operation of the various components of the networked environment 100 is provided. To begin, data in the action table 134 is specified by, for example, an administrator of the network switch 103. The action table 134 may include matching criteria for a network frame 139 and one or more corresponding actions to be initiated in response to a matching network frame 139. Each set of matching criteria may include one or more prefix addresses and a corresponding mask to be compared against the network frames 139, as well as potentially other associated criteria such as a VID. The mask for a prefix address may be used to specify the portions of the prefix address and a network address of a network frame 139 to be compared. The prefix address and mask may be specified in a various formats such as, for example binary, decimal, hexadecimal, dot-decimal notation, and/or other formats appropriate for identifying a given type of network frame 139 as can be appreciated.

As a non-limiting example, an entry in the action table 134 may comprise matching criteria of a 48-bit hexadecimal prefix address of 01-23-45-67-00-00 with a decimal mask of 32 bits and a VID of 5. The corresponding set of actions for the entry may be to, for example, move matching network frames 139 into a high priority queue and mark the header of the network frame 139 as high priority. In this example, network frames 139 having a VID of 5 and media access control (MAC) address values between 01-23-45-67-00-00 and 01-23-45-67-FF-FF would match the example criterion, but a network address of 01-23-45-68-00-00 would fail to match due to a difference in the value of the $4^{th}$ octet, one of the 32 bits used for matching in this example. In response to a network frame matching a set of criteria, the set of actions corresponding to the criteria may be initiated.

In some embodiments, matching criteria may further be specified with varying degrees of particularity such as, for example, comparing a prefix address and mask only to a source network address of a network frame 139, but not the destination address. Other possible criteria may include the type of network frame 139, specific network interfaces 109, other values within the network frame 139, network conditions under which to apply the criteria, and/or other criteria as can be appreciated. Each set of matching criteria may further combine criteria using standard Boolean logic operators to identify matching network frames 139 to which to apply a corresponding set of actions.

For example, a set of matching criteria applicable to extended unique identifier (EUI) 64-bit addresses may include a first prefix of 01-23-45-00-00-00-00-00 with a mask of 24 bits, combined using a logical "AND" with a second prefix that excludes 01-23-45-67-89-00-00-00 with a mask of 40 bits. In this example, all EUI-64 network frames 139 having an address with the first three octets of 01-23-45 would match, except those having an address with the first five octets of 01-23-45-67-89. Additionally, these criteria may further be combined using a logical "OR" with a criterion matching the network frames 139 having, for example, a VID of 5.

Once the data of the action table 134 is defined using the various levels of specificity, combinations and/or conditions that may be possible, the comparator engine 121 may obtain the action table 134 and convert the criteria into a form suitable for comparison to network frames 139. For example, the comparator engine 121 may take a set of matching criteria applicable to MAC-48 addresses using a prefix of 01-23-45-00-00-00 with a decimal mask of 24 bits, representing the 24-bit organizationally unique identifier (OUI) portion of a MAC-48 address. The hexadecimal prefix 01-23-45-00-00-00 may be converted into a binary equivalent that would permit simplified comparison to the binary format found in network frames 139. Furthermore, the 24-bit mask may be converted into a sequence of 24 bits of 1's and a sequence of 0's for the remaining bits of the type(s) of network addresses to be compared. Because the matching criteria used in this example is applicable only to MAC-48 addresses, the sequence of 0's for the converted mask will also be 24 bits long. If the matching criteria had instead been applicable to EUI-64 addresses, still using a 24-bit mask, the converted mask would be a sequence of 24 1's and a sequence of 40 0's. The converted forms of the matching criteria may be stored in a cache accessible to the comparator engine 121 and/or elsewhere within the memory 112. In other embodiments, the comparable portions of each network frame may be converted instead of or in addition to converting the matching criteria of the action table 134. Such conversions may simplify the comparison operations such that, for example, one or more bitwise logical AND operations may be used to perform the actual comparison for each set of criteria involving values of a network frame 139. Various other techniques may be used for performing the comparison(s) as can be appreciated.

Once the comparator engine 121 has performed any conversion or other processing of the matching criteria of the action table 134, the comparator engine 121 may apply the matching criteria to network frames 139 received from network interface devices 106a-N. The comparator engine 121 may process network frames 139 as the frames are in the frame buffer(s) 137 for the network interfaces 109, in various queues 131, and/or in other portions of the network switch 103 where network frames 139 may exist.

For a given network frame 139, the comparator engine 121 may apply the one or more sets of matching criteria, including converted forms thereof, from the action table 134 in order to generate a truth value for the comparison. The truth value indicates whether or not the matching criteria successfully matched the network frame 139. In some embodiments, the sets of matching criteria may be compared in the order specified within the action table 134 with the first set of successful matching criteria being the only set of actions applied to the network frame 139. In other embodiments, a plurality of sets of matching criteria may be applied to a network frame 139, as well as a plurality of sets of actions corresponding to the matching sets of criteria.

As a non-limiting example of the latter embodiment, a network frame 139 matching a set of criteria may initiate the corresponding actions, which would not exclude further actions from the action table 134 if the frame is correlated with other sets of matching criteria. Various actions may be initiated for a network frame 139 such as, for example, placing the network frame 139 in a queue, changing the queue of a network frame 139, marking the network frame 139 with a priority code point (PCP) or other priority value, inserting another header into the network frame 139, changing the VID of the network frame 139, changing a counter value, logging the network frame 139, discarding the network frame 139, and/or other possible actions as can be appreciated.

In some embodiments, the comparator engine 121 may examine a network frame 139 using a plurality of matching criteria in parallel and/or may examine a plurality of network frames 139 in parallel. Before and after a network frame 139 has been processed by the comparator engine 121, the network frame 139 may undergo processing by one or more other components of the network switch 103 as can be appreciated.

Processing network frames 139 using the techniques disclosed may enable rapid identification of the sought network frames 139, thus producing improvements in the perceived service quality. As a non-limiting example, VoIP services such as session initiation protocol (SIP) may depend on low latency transmission of the associated network frames 139 in order to offer high call quality.

One possible approach to accommodating SIP may detect a network interface device 106a-N that has established a SIP session by inspecting the content of network frames 139, then placing the network frames 139 from the network interface device 106a-N into a high priority queue 131 for transmission. However, the inspection process may take considerable time to recognize the SIP session, and obviously the inspection process may only recognize the SIP session after it, and thus a call or conversation, has begun. Until the inspection identifies the SIP session, the network frames 139 may be processed with no assigned priority, likely resulting in poor call quality.

However, using the techniques disclosed, the one or more network interface device 106a-N using SIP may be predefined in the action table 134 using a prefix address and mask, as well as potentially a VID. Therefore, network frames 139 for the SIP session of the network interface device 106a-N may be placed in the high priority queue 131 without the delay associated with recognizing the SIP session through inspection of the content of the network frames 139. As a result of the rapid processing, the call quality may be consistently high throughout the call.

Figure 2:
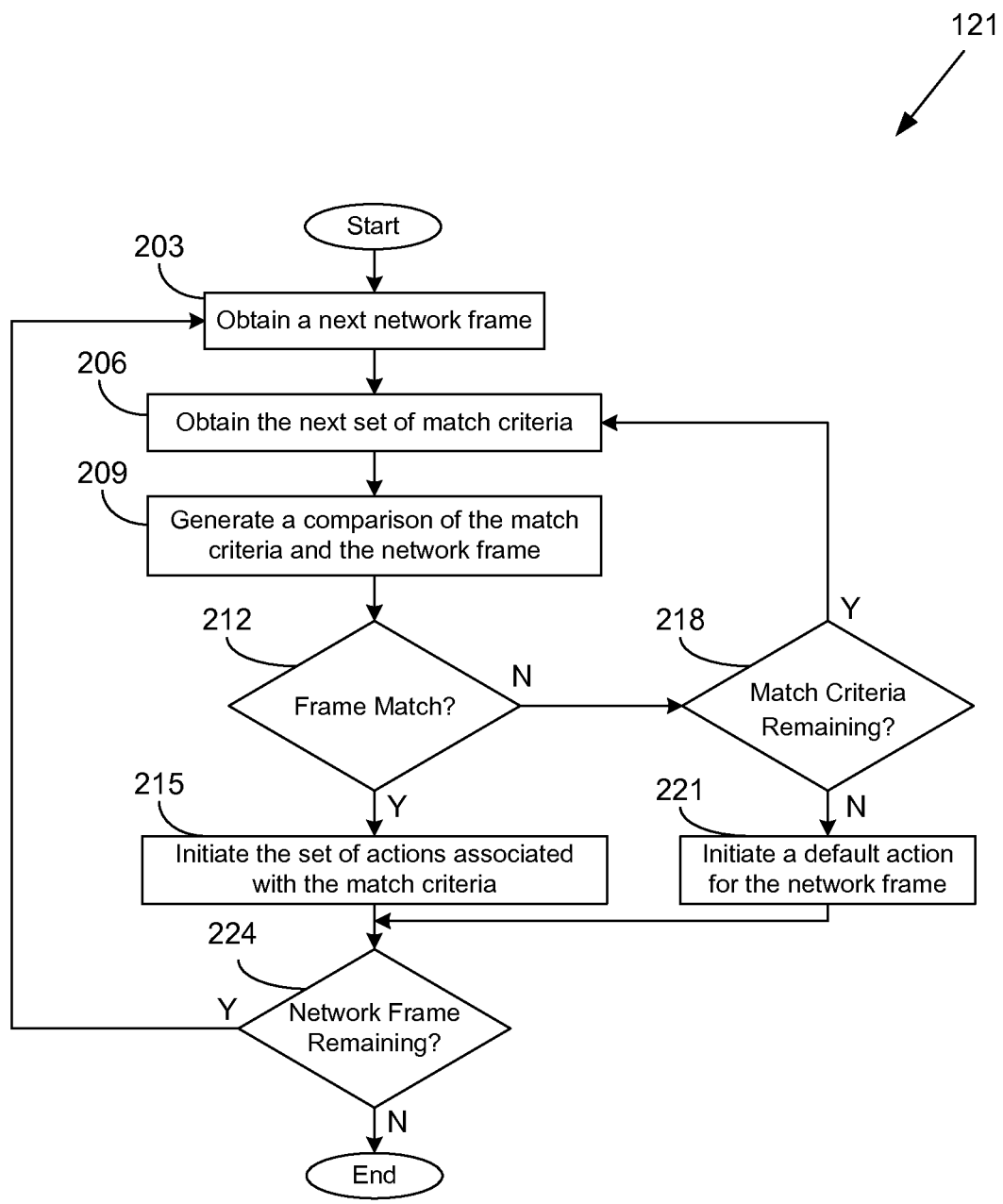
FIG. 2 is a flowchart illustrating an example of functionality implemented as a portion of the comparator engine in the network switch of the networked environment of FIG. 1.

Turning now to FIG. 2, shown is a flowchart that provides one example of the operation of a portion of the comparator engine 121 according to various embodiments. It is understood that the flowchart of FIG. 2 provides merely an example of the many different types of functional arrangements that may be employed to implement the operation of the portion of the comparator engine 121 as described herein. As an alternative, the flowchart of FIG. 2 may be viewed as depicting an example of steps of a method implemented in the network switch 103 (FIG. 1) according to one or more embodiments.

This portion of the execution of the comparator engine 121 may be invoked in response to receiving notice of one or more network frames 139 (FIG. 1) to be processed. As discussed previously, prior to processing a network frame 139, the comparator engine 121 may convert various data from action table 134 (FIG. 1) into one or more forms suitable for comparison to network frames 139 as can be appreciated. Beginning with box 203, the comparator engine 121 identifies a network frame 139 for processing. The network frame 139 may be present in the frame buffer(s) 137 (FIG. 1), the queues 131 (FIG. 1), and/or other locations of the network switch 103.

Next, in box 206, the next set of match criteria are obtained for comparison to the network frame 139. As discussed previously, the sets of match criteria be compared sequentially, or have the appearance of being compared sequentially, based upon the order of specification within the action table 134. Comparisons conducted in parallel may be carried out with little regard to concurrency if any corresponding actions are initiated according to the sequential order. Then, in box 209, the comparator engine 121 compares the set of match criteria to the network frame 139. The match criteria corresponding to a set of actions may require one or more comparisons based upon the specificity, combinations and/or conditions of criteria that may be specified. Each set of match criteria for an action may contain criteria that are combined using various logical operators and combinations of operators as can be appreciated.

As a non-limiting example, a network frame 139 that fails to match a criterion that is combined with other criteria using only a logical AND need not be compared to the remaining criteria in order to determine the truth value for the comparison to this set of criteria is false. Similarly, a network frame 139 that matches a criterion that is combined with other criteria using only a logical OR need not be compared to the remaining criteria in order to determine the truth value for the comparison to this set of criteria is true.

Subsequently, in box 212, the comparator engine 121 determines whether the truth value for a given set of match criteria is true, thus indicating a successful match to a network frame 139. If the truth value is true, execution of the comparator engine proceeds to box 215. Alternatively, if the truth value is false, execution of the comparator engine proceeds to box 218. In box 218, the comparator engine 121 determines if any further sets of match criteria remain to be compared. The sets of match criteria be compared sequentially, or have the appearance of being compared sequentially, based upon the order of specification within the action table 134.

If additional sets of match criteria remain to be examined, execution of the comparator engine 121 returns to box 206. Alternatively, if no further sets of match criteria remain to be compared, in box 221, the comparator engine 121 may initiate a default action for the network frame. Thereafter, execution of the comparator engine 121 proceeds to box 224.

Returning to box 215, if the network frame 139 matched the set of criteria, the comparator engine 121 may initiate the set of actions associated with the set of matching criteria. As discussed previously, one or more actions may be initiated for a network frame 139 such as, for example, placing the network frame 139 in a queue, changing the queue of a network frame 139, marking the network frame 139 with a PCP or other priority value, inserting another header into the network frame 139, changing the VID of the network frame 139, changing a counter value, logging the network frame 139, discarding the network frame 139, and/or other possible actions as can be appreciated.

Then, in box 224, the comparator engine 121 determines if another network frame 139 is ready to be examined. If another network frame 139 is ready, then execution of the comparator engine 121 returns to box 203. Alternatively, if no further network frame 139 is ready for examination, this portion of the comparator engine 121 ends as shown. In this end state, the comparator engine may be reactivated upon receiving notice of a network frame 139 to be processed.

Figure 3:
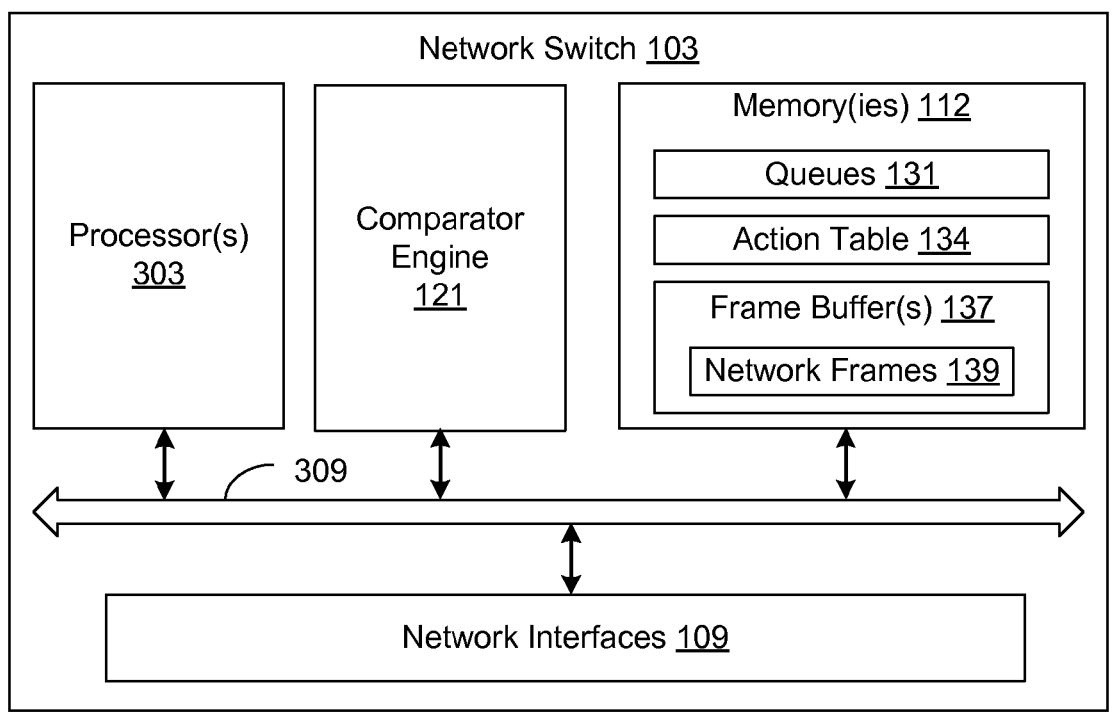
FIG. 3 is a schematic block diagram that provides one example illustration of a network switch employed in the networked environments of FIG. 1 according to various embodiments of the present disclosure.

With reference to FIG. 3, shown is a schematic block diagram of the network switch 103 according to an embodiment of the present disclosure. The network switch 103 represents an example of one system in which an embodiment of the disclosure can be implemented. It should be appreciated that embodiments of the disclosure can be implemented in various types of systems or any device, such as a general purpose computing device, in which a comparator engine 121 can be employed. The depicted network switch 103 includes at least one processor circuit, for example, having a processor 303, network interface(s) 109, and a memory 112, all of which are coupled to a local interface 309. The network interface 109 can comprise, for example, one or more interconnections to a physical network and/or wireless network. The local interface 309 may comprise, for example, a data bus with an accompanying address/control bus or other bus structure as can be appreciated.

Stored in the memory 112 are both data and components that can be retrieved and/or executed by the processor 303. In particular, stored in the memory 112 are the queues 131, action table 134, frame buffer(s) 137, and/or other data. In addition, an operating system executable by the processor 303 may be stored in the memory 112. It is understood that there may be other applications or data that are stored in the memory 112 which are executable by the processor 303 as can be appreciated.

In the depicted embodiment, the comparator engine 121 is implemented as a hardware component or processor that is coupled to the local interface 309. In some embodiments, the comparator engine 121 can be implemented along with the other functionality associated with the network switch 103 in a custom logic board. In yet other embodiments, the comparator engine 121 can be implemented as software executable by a processor. Other variations should be appreciated by a person of ordinary skill in the art.

In this respect, the term "executable" means a program file that is in a form that can ultimately be run by the processor 303. Examples of executable programs may be, for example, a compiled program that can be translated into machine code in a format that can be loaded into a random access portion of the memory 112 and run by the processor 303, source code that may be expressed in proper format such as object code that is capable of being loaded into a random access portion of the memory 112 and executed by the processor 303, or source code that may be interpreted by another executable program to generate instructions in a random access portion of the memory 112 to be executed by the processor 303, etc. An executable program may be stored in any portion or component of the memory 112 including, for example, random access memory (RAM), read-only memory (ROM), hard drive, flash memory, solid-state drive, memory card, optical disc such as compact disc (CD) or digital versatile disc (DVD), floppy disk, magnetic tape, or other memory components.

The memory 112 is defined herein as including both volatile and nonvolatile memory and data storage components. Volatile components are those that do not retain data values upon loss of power. Nonvolatile components are those that retain data upon a loss of power. Thus, the memory 112 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 112 may represent multiple memories 112 that operate in parallel processing circuits, respectively. In such a case, the local interface 309 may be an appropriate network that facilitates communication between any two of the multiple processors 303, between any processor 303 and any of the memories 112, or between any two of the memories 112, etc. The local interface 309 may comprise additional systems designed to coordinate this communication, including, for example, performing load balancing. The processor 303 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the comparator engine 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, can be embodied in any non-transitory computer-readable medium for use by or in connection with an instruction execution system such as, for example, a processor 303. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A network switch, comprising:
   circuitry configured to:
      store a plurality of matching criterion in an action table, each matching criteria including at least one prefix address, a mask corresponding to the at least one prefix address, and a set of actions;
      obtain a network frame via a network interface, the network frame including a network address in a header of the network frame, the network address being a physical source address of a network interface device;
      determine whether the network frame matches at least one prefix address of a matching criteria and a mask of the matching criteria;
      determine whether the network frame matches at least one prefix address and a mask of another matching criteria in the action table; and
      initiate a set of actions corresponding to the matching criteria for the network frame if the network frame matches the at least one prefix address and the mask of the matching criteria or a set of actions corresponding to the another matching criteria for the network frame if the network frame matches the at least one prefix address and the mask of the another matching criteria.

2. The network switch of claim 1, wherein the circuitry is further configured to initiate a predetermined action for the network frame if none of the plurality of matching criterion matches the network frame.

3. The network switch of claim 1, wherein one of the set of actions includes placing the network frame in a queue, changing a queue of the network frame, marking the network frame with a priority code point (PCP), inserting a header into the network frame, changing a virtual local area network identifier (VID) of the network frame, changing a counter value, logging the network frame, and discarding the network frame.

4. The network switch of claim 1, wherein each matching criteria further includes a virtual local area network identifier (VID).

5. The network switch of claim 4, wherein the circuitry is further configured to determine whether the network frame matches the VID of the matching criteria.

6. The network switch of claim 1, wherein the circuitry is further configured to determine whether the network frame matches the matching criteria based on a standard Boolean logic operator in the matching criteria.

7. The network switch of claim 1, wherein one of the set of actions includes modifying the header of the network frame according to Institute of Electrical and Electronics Engineers (IEEE) 802.3ac.

8. The network switch of claim 1, wherein the network address is a media access control (MAC) address.

9. The network switch of claim 1, wherein one of the set of actions includes inserting an Institute of Electrical and Electronics Engineers (IEEE) 802.1Q header into the header of the network frame.

10. A method for utilizing a network switch, comprising:
    storing, via circuitry, a plurality of matching criterion in an action table, each matching criteria including at least one prefix address, a mask corresponding to the at least one prefix address, and a set of actions;
    obtaining, via the circuitry, a network frame via a network interface, the network frame including a network address in a header of the network frame, the network address being a physical source address of a network interface device;
    determining, via the circuitry, whether the network frame matches at least one prefix address of a matching criteria and a mask of the matching criteria;
    determining, via the circuitry, whether the network frame matches at least one prefix address and a mask of another matching criteria in the action table; and
    initiating, via the circuitry, a set of actions corresponding to the matching criteria for the network frame if the network frame matches the at least one prefix address and the mask of the matching criteria or a set of actions corresponding to the another matching criteria for the network frame if the network frame matches the at least one prefix address and the mask of the another matching criteria.

11. The method of claim 10, further comprising:
    initiating a predetermined action for the network frame if none of the plurality of matching criterion matches the network frame.

12. The method of claim 10, wherein one of the set of actions includes placing the network frame in a queue, changing a queue of the network frame, marking the network frame with a priority code point (PCP), inserting a header into the network frame, changing a virtual local area network identifier (VID) of the network frame, changing a counter value, logging the network frame, and discarding the network frame.

13. The method of claim 10, wherein each matching criteria further includes a virtual local area network identifier (VID).

14. The method of claim 13, further comprising:
    determining whether the network frame matches the VID of the matching criteria.

15. The method of claim 10, further comprising:
    determining whether the network frame matches the matching criteria based on a standard Boolean logic operator in the matching criteria.

16. The method of claim 10, wherein one of the set of actions includes modifying the header of the network frame according to Institute of Electrical and Electronics Engineers (IEEE) 802.3ac.

17. The method of claim 10, wherein the network address is a media access control (MAC) address.

18. The method of claim 10, wherein one of the set of actions includes inserting an Institute of Electrical and Electronics Engineers (IEEE) 802.1Q header into the header of the network frame.

* * * * *